(No Model.) 3 Sheets—Sheet 2.
D. O. EVEREST & L. C. LULL.
SPRING TOOTH HARROW.

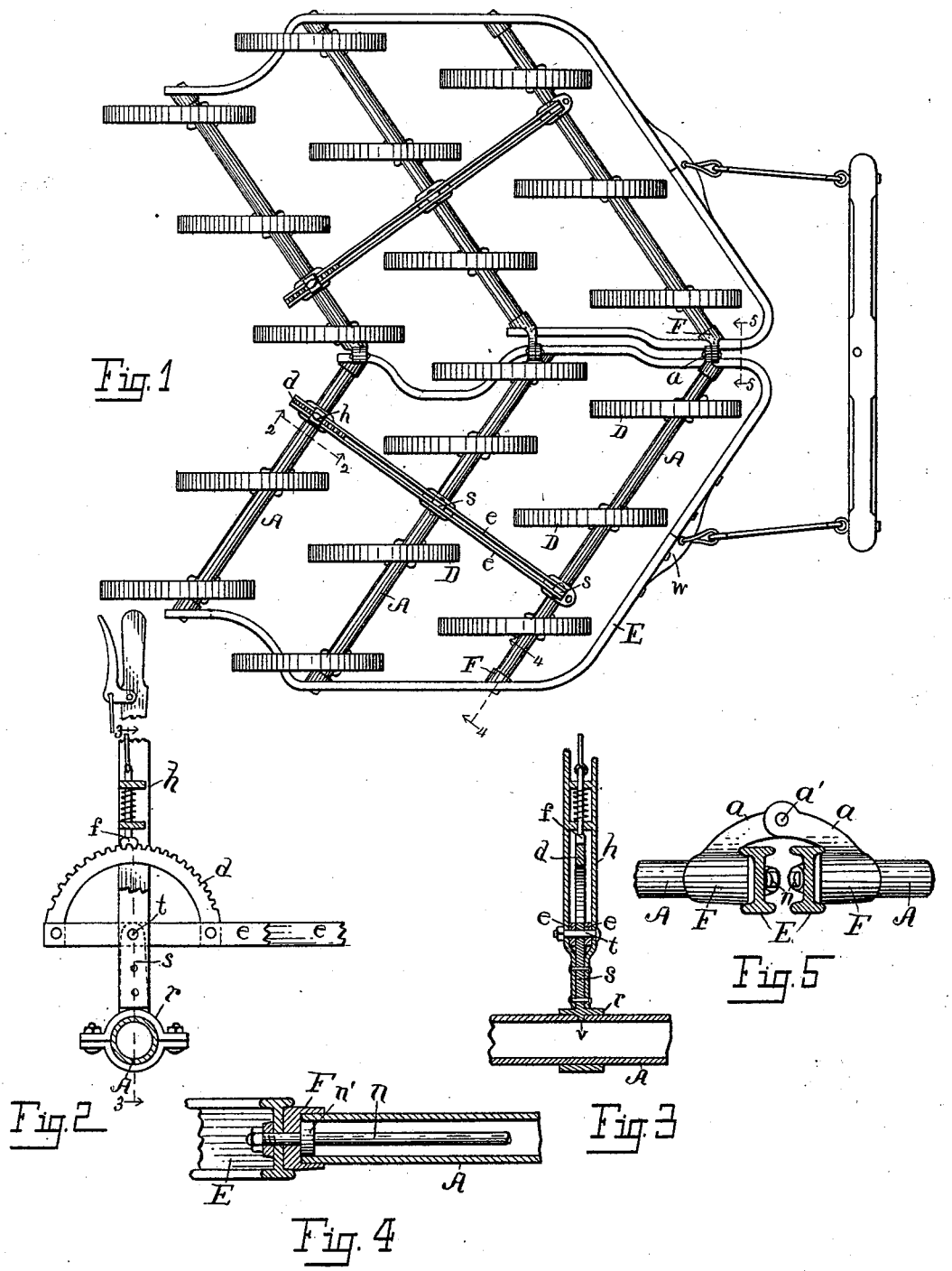

No. 516,302. Patented Mar. 13, 1894.

(No Model.) 3 Sheets—Sheet 3.

D. O. EVEREST & L. C. LULL.
SPRING TOOTH HARROW.

No. 516,302. Patented Mar. 13, 1894.

Witnesses:
Cora E. Westbrook
Walter S. Wood

Inventors
David O. Everest & Lynn C. Lull
By Fred L. Chappell
Att'y

# UNITED STATES PATENT OFFICE.

DAVID O. EVEREST, OF PINE GROVE, AND LYNN C. LULL, OF KALAMAZOO, MICHIGAN.

SPRING-TOOTH HARROW.

SPECIFICATION forming part of Letters Patent No. 516,302, dated March 13, 1894.

Application filed January 9, 1893. Serial No. 457,826. (No model.)

*To all whom it may concern:*

Be it known that we, DAVID O. EVEREST, residing in the township of Pine Grove, in the county of Van Buren, and LYNN C. LULL, residing in the city and county of Kalamazoo, State of Michigan, citizens of the United States, have invented certain new and useful Improvements in Spring-Tooth Harrows, of which the following is a specification.
Our invention relates to improvements in float harrows and more particularly to that class of harrows having curved teeth of spring steel, that are adjusted in their fastening and also adjustable by means of a lever.
The objects of our invention are first, to provide a clip for holding the teeth, in which the shanks of the teeth will come between the bolts and the ground; second, to provide a simple and strong fastening for attaching the rocking cross bars in the frames; third, to provide a catch for the adjusting lever capable of varying the adjustment in small amounts; fourth, to provide a harrow of the so-called "butterfly" shape that is adjustable by a lever. We accomplish these objects by the devices shown in the accompanying drawings, in which—

Figure 6:
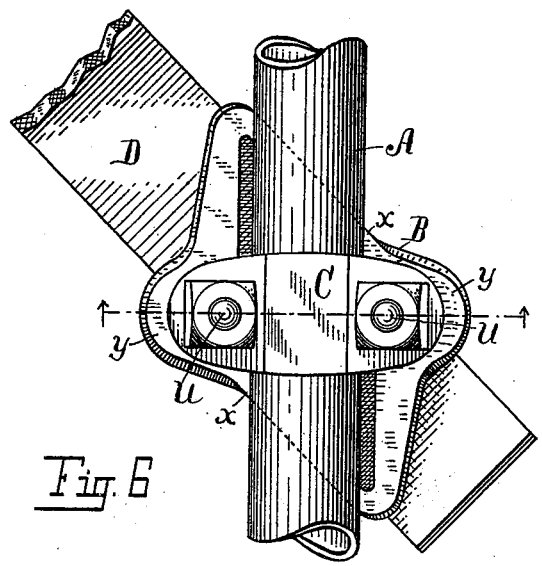
Figure 7:
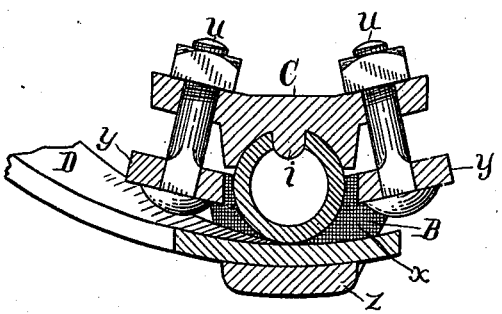
Figure 8:
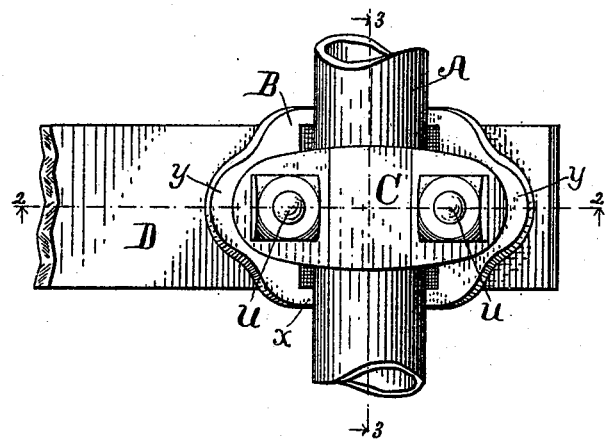
Figure 9:
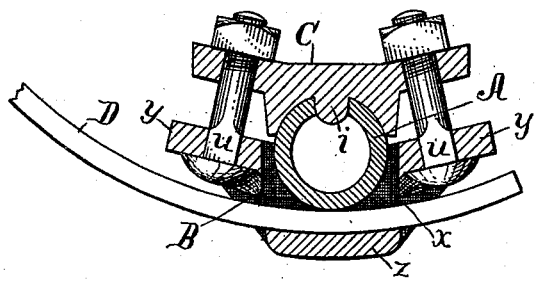
Figure 10:
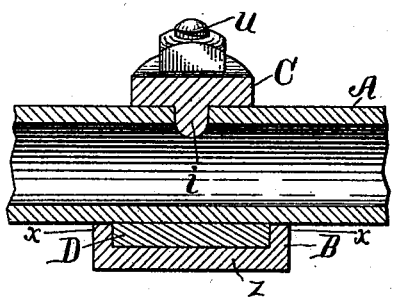

Figure 1, is a plan view of our harrow. Fig. 2, is a view of the lever from line 2—2 of Fig.
1. Fig. 3, is a view of the lever on line 3—3 of Fig. 2. Fig. 4, is a view on line 4—4 of Fig. 1, showing method of attaching the cross bars. Fig. 5, is a view of one of the hinge joints between the sections of the harrow from line 5—5 of Fig. 1. Fig. 6, is a detail top view of the fastening of a tooth to the cross bar. Fig. 7, is a view on line 7—7 of Fig. 6. Fig. 8, is a top view of a modified form of the fastening for attaching the teeth. Fig. 9, is a view on line 2—2 of Fig. 8 and Fig. 10 is a view on line 3—3 of Fig. 8.

Similar letters of reference refer to similar parts throughout the several views.

Our invention consists of a harrow frame in two sections hinged together making a double harrow of the so-called butterfly shape. The sections of the frame are made of double T steel bent into the form appropriate for a harrow of the butterfly shape. Hollow bars A, run diagonally across the frame and are held in place by means of the cap F, and the rod $n$, having the shoulder $n'$ with a nut at the end of the rod bolting the frame E, solid against the shoulder at each end of the rod. Both ends of the rod $n$, are the same and the distance between the outside of the shoulder $n'$, at each end of the rod, is a little more than the length of the hollow bar A, so that the bar A, is held loosely and is rockable in the cap F, or on the enlarged end of the rod back of the shoulder $n'$. It will be clear that either the cap F, or the enlarged end of the rod would be sufficient to keep the bar A, in place but we prefer to put on both the caps F, and enlarge the ends of the rod $n$ also. The caps F, on the inside of the sections have a projecting portion or lug $a$, which passes up to a like lug on the opposite frame and are joined by the pivot $a'$. The inside ends being in a straight line to permit the raising of one half of the harrow at any time whenever it shall be necessary. The teeth D, are attached to the bars A, by means of the clips shown in Figs. 6 and 7, which show the teeth D, attached at an angle to the bar so that they will draw straight back. They might be attached at right angles to the bar as shown in Figs. 8, 9, and 10, at points on the bars that would bring the points of the teeth into the same relative positions as shown in the plan view in Fig. 1.

For convenience and clearness in description we will first explain our clip in the form that holds the tooth at right angle to the bar; and then point out the slight variation of the clip where it holds the tooth D, at an acute angle to the bar A. The lower piece B, of the clip has two parallel side walls $x$, $x$, the same distance apart as the width of the teeth, a cross portion $z$, passes under the tooth and two cross portions $y$, $y$, pass above the tooth and connect the two parallel sides of the piece together and hold the tooth D as in a yoke. The side walls $x$, being the same distance apart as the width of the tooth prevent the tooth having any sidewise motion. The side walls are so formed that when the lower part of the clip is bolted to the upper half it draws the tooth tight against the cross bar A.

In the cross portions $y$, $y$, of the clip are bolt holes for the bolts $u$, $u$. The bolts are placed in these holes before the tooth is slipped into the clip. It will thus be seen that the ends of the bolts are above the tooth and are so protected from wear. The upper piece C, of the clip runs square across the bar A, and is shaped to fit the outer surface of it. There is a pintle $i$ adapted to fit a hole drilled into the bar. There is a bolt hole in each end of the piece C, corresponding to the bolt holes in the piece B, below. As the parts B, and C, of the clip do not touch each other, it will be observed that by loosening one bolt and tightening the other each tooth can be adjusted on the bar by itself. The only difference between this clip that holds the tooth square across the bar A, and the one that holds the tooth at an angle is that the walls of the lower piece B of the clip are placed at the desired angle to the bar and the bolt holes drilled in such a position in the cross portions $y$, $y$, that the upper piece C, of the clip still crosses the bar A, at right angles. This will be clear on examining Figs. 6 and 7.

To each of the cross bars A, of each section is attached an upwardly projecting arm $s$. The arms are attached by a clip and have a pintle that projects into a hole drilled into the bar A, to hold them the same as in the clip for the tooth. To the upper ends of the arms $s$, is pivoted a horizontal bar $e$ so that it is at the same angle with all the arms $s$. At one end of the horizontal bar $e$ is attached a segment of a circle having teeth on its periphery. A lever $h$ projects up at the same point and is bolted at its lower end to the upwardly projecting arm $s$ at that point. On the lever $h$, is a catch operated by the latch trip at the top of the lever $h$. The catch has two or more teeth that catch between the teeth of the segment $d$. The teeth on the segment are small and regular and the teeth of the catch correspond. This makes it possible to shift the lever over the small space taken up by a single tooth of the segment and yet it holds as firmly as though the teeth were larger.

We are aware that harrows have been in use prior to our invention in which the teeth were adjusted by a lever so we do not claim that broadly, but What we do claim, and desire to secure by Letters Patent, is—

1. In a harrow the tooth bar A united to the tooth D by the clip consisting of the combination of the part C fitted to the upper periphery of the bar A and the piece B, having side walls $x$ $x$. and cross connecting portions $y$. $y$. and $z$ the cross portion $z$ having a seat for the tooth D and the cross portion $y$. $y$. united by bolts $u$ $u$ to the upper part C, so tooth D is between the heads of the bolts $u$. $u$. and the ground, substantially as described for the purpose specified.

2. The combination in a harrow having rocking bars controlled by a lever of the frame E, the rod $n$, having the shoulders $n'$, and rocking bars adapted to rock on said rod $n$, for the purpose specified.

3. In a harrow having rocking bars bearing teeth controlled by a lever the combination of the shouldered rod $n$, the cap F, the frame E, at one end and the cap F, with the lugs $a$, at the other end, bearing the hollow cross bar A, substantially as described for the purpose specified.

4. In a double float harrow, the combination of the frame E, the rods $n$ with shoulder $n'$, the caps F, the hollow cross bars A, bearing the teeth D, attached by the clip, consisting of the parts B and C. The lever $h$, the fine toothed segment $d$, and the toothed catch $f$, the arms $s$, the horizontal bar $e$, the lugs $a$ pivoted at $a'$, all substantially as described for the purpose specified.

In witness whereof we have hereunto set our hands and seals in the presence of two witnesses.

DAVID O. EVEREST. [L. S.]
LYNN C. LULL. [L. S.]

Witnesses:
DALLAS BOUDEMAN,
JOHN W. ADAMS.